(No Model.)
O. ZISTEL.
LAWN MOWER.
No. 347,311. Patented Aug. 10, 1886.
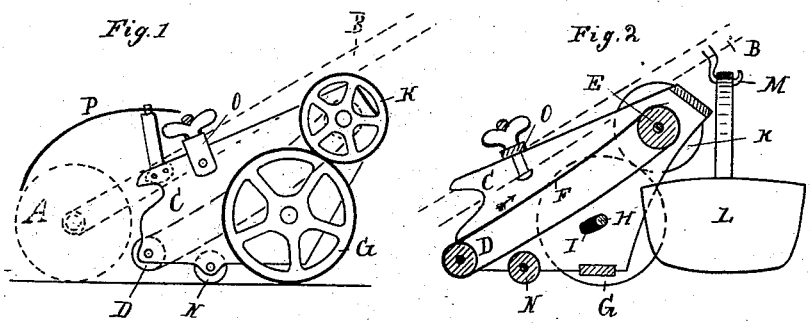
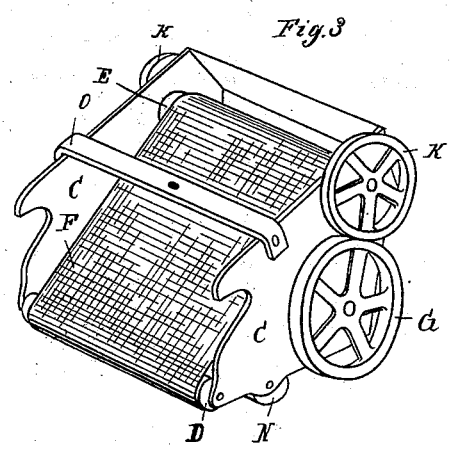
Attest:
John Schuman.
E. Scully.
Inventor:
Oscar Zistel.
by his Atty
Thos. S. Sprague

UNITED STATES PATENT OFFICE.

OSCAR ZISTEL, OF SANDUSKY, OHIO.

LAWN-MOWER.

SPECIFICATION forming part of Letters Patent No. 347,311, dated August 10, 1886.

Application filed September 16, 1885. Serial No. 177,272. (No model.)

*To all whom it may concern:*

Be it known that I, OSCAR ZISTEL, of Sandusky, in the county of Erie and State of Ohio, have invented new and useful Improvements in Attachments to Lawn-Mowers; and I do hereby declare that the following is a full, clear, and exact description thereof, reference being had to the accompanying drawings, which form a part of this specification.

This invention relates to a new and useful improvement in lawn-mowers; and the invention consists more specifically in a device for collecting the grass cut off by the lawn-mower, said device being in the nature of an attachment to a lawn-mower, all as hereinafter described.

In the drawings which accompany this specification, Figure 1 is a side view of a lawn-mower to which my device for collecting the grass is secured. Fig. 2 is a vertical central longitudinal section of Fig. 1, showing also the basket and its support. Fig. 3 is a perspective view of the device detached.

A is the main wheel of a lawn-mower of any known construction and operation, and B is the handle for propelling it. I have not shown more of the lawn-mower, as it is thought the parts illustrated will be sufficient for the understanding of the operation of my invention. I have shown these parts in dotted lines, so as not to confound them with the parts constituting my invention.

Attached at the rear of this lawn-mower is my device for collecting the grass; it is constructed as follows:

C C are two side frames, which at their forward ends are preferably shaped to fit against the rear ends of the side frames of the lawn-mower, so as to form a rearward extension thereof.

D and E are two transverse rolls journaled in the side frames, and F is an endless traveling apron passing around the two rolls.

G are two wheels supporting the device. They are secured to an axle, H, which is journaled in the slots I in the side frames, and K K are two friction-wheels secured upon the shaft of the roll E, and adapted to transmit motion to this roll by frictional contact with the wheels G.

L is a basket detachably secured under the rear end of the traveling apron, which at this end is sufficiently raised from the ground to make room for it. This basket may be suspended from a hook, M, on the handle, or be detachably secured in any other manner.

N is a guide-roll or traveler journaled near the forward roll, D, to keep it from touching the ground.

O is a cross-bar, provided with a suitable fastening, such as a thumb nut and screw, to secure the device to the handle of the lawn-mower.

P is a shield or deflector secured in any suitable way to the side frames, C, as shown, or to any part of the attachment. This shield projects forward over the cutting-knives of the lawn-mower, and is designed to direct the cut grass onto the apron F and prevent said grass from flying in any other direction.

In practice the parts above described are so arranged that when the lawn-mower is operated by pushing it forward over the ground in the usual manner, the cut-off grass will be thrown onto the traveling apron and carried into the basket, the shield or deflector being so arranged as to prevent the grass from flying in any other direction. If the lawn-mower is drawn backward, the shaft H of the wheels G will slide forward in the slots I, and the apron will have no motion.

It will be easily seen that it is optional with me to make my device either in the form of a separate and independent attachment to lawn-mowers, or to combine it with a lawn-mower so as to make it an integral part thereof. It will also be seen that the details of my device may be varied within the spirit of my invention, some of which may be optional and some conditional, upon different styles of lawn-mowers. It is also optional to use the two pairs of wheels G and K or only one pair.

The shield or deflector P is not a necessary element to the device, it being only of use in high grass; but where a lawn is cut at short intervals, as is the usual practice, the shield may be dispensed with, for all the particles of grass that are carried over by the knives are thrown onto the standing grass in front of the knives, and are thus subsequently picked up.

What I claim as my invention is—

1. An attachment to lawn-mowers, consisting of the frame provided with means for detachably securing the same to a lawn-mower in rear of the cutting-knives thereof, and an endless carrier supported on rollers on said frame, and constructed and arranged to receive and carry the cut grass to the rear of the same, substantially as described.

2. In an attachment to lawn-mowers, the following elements combined: an endless carrier, means for securing the attachment to a lawn-mower in rear of the cutting-knives, and a shield or deflector for throwing the cut grass onto said carrier, all arranged substantially as described.

3. As a new article of manufacture, a grass-collector for lawn-mowers having the following parts in combination: an endless carrier traveling between the two side frames, supported upon wheels, drive-connection between the wheels and the endless carrier, devices for securing the machine detachably in rear of a lawn-mower, and a shield for throwing the grass onto the carrier, all arranged substantially as described.

4. In an attachment to lawn-mowers, the combination of the side frames, C C, rolls D E, journaled in said frames, endless apron F, wheels G, friction-wheels K, cross-bar O, provided with thumb-screw, and a shield, P, secured to said frames, and all arranged and operating substantially as described.

5. In a grass-collecting device for lawn-mowers, the combination of an endless carrier secured in a detachable frame in the rear of the knives, and having supporting-rollers, with a drive-connection for the carrier, and means for detachably securing said frame in rear of a lawn-mower, substantially as described.

6. In a grass-collecting device for lawn-mowers, the combination of a frame provided with means for detachably securing the same to a lawn-mower in the rear of the cutting-knives thereof, an endless carrier secured in said frame, and supporting-rollers journaled in slots of the frame of the carrier, substantially as described.

OSCAR ZISTEL.

Witnesses:
E. SCULLY,
H. S. SPRAGUE.